Dec. 16, 1969  L. B. BARTO  3,483,895
PIPELINE SHUTOFF DEVICE
Filed Oct. 22, 1965
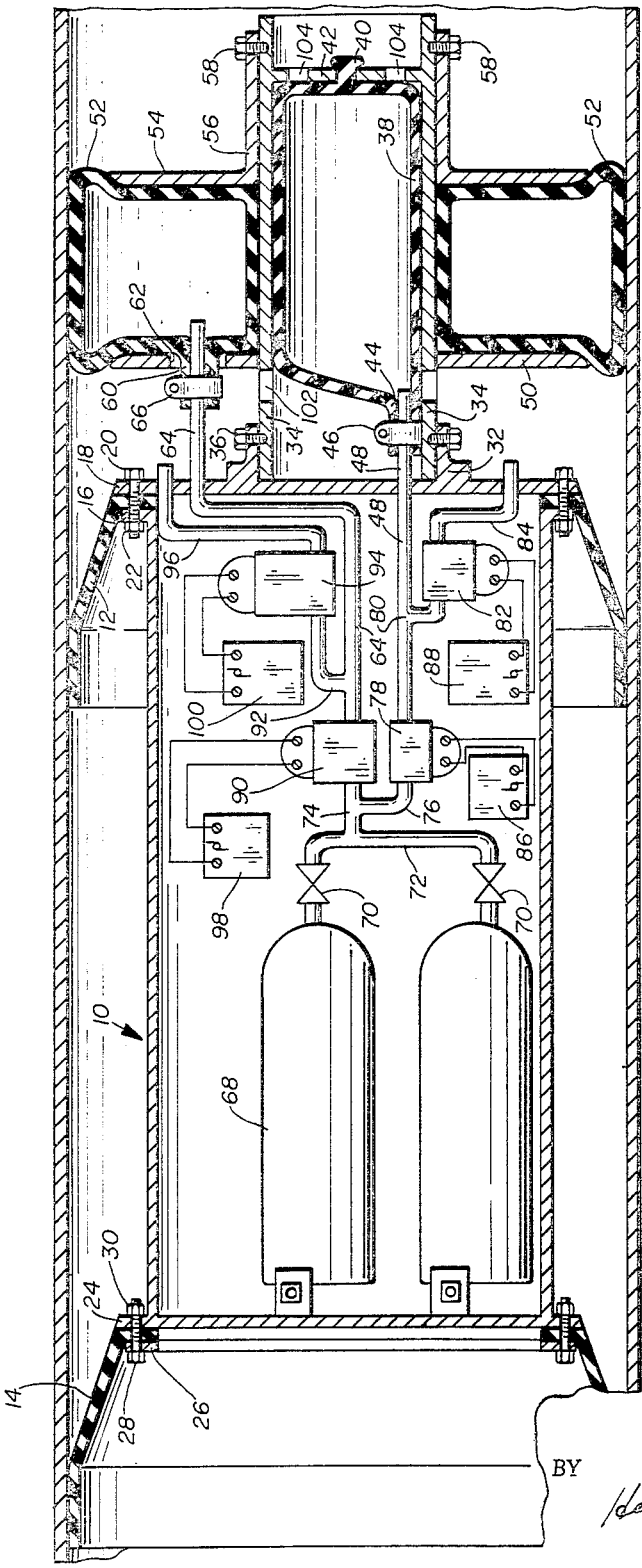
INVENTOR.
LAWRENCE B. BARTO
BY
*Head & Johnson*
ATTORNEYS

United States Patent Office 3,483,895
Patented Dec. 16, 1969

3,483,895
PIPELINE SHUTOFF DEVICE
Lawrence B. Barto, 118 E. Oak St.,
Drumright, Okla. 74030
Filed Oct. 22, 1965, Ser. No. 502,188
Int. Cl. F16l 55/12
U.S. Cl. 138—97         4 Claims

ABSTRACT OF THE DISCLOSURE

A pipeline shutoff pig for closing the interior of a pipeline in response to a radio signal source from outside the pipeline. The pipeline pig includes an inflatable sealing means carried by a body portion, a gas dispensing means carried by the body portion connected to the inflatable sealing means, a first radio actuated means between the gas dispensing means and the inflating sealing means, the pipeline pig being free to move within the pipeline when the inflatable means is in a deflated condition and when a radio signal is received from an outside source the first valve means is opened permitting gas to flow from the gas dispensing means to the sealing means to cause the sealing means to expand and seal against the interior of the pipeline bore, and includes a second radio actuated valve means connected between the sealing means and an exhaust port which, when actuated from a radio signal, is open to exhaust the gas pressure from the sealing means.

This invention relates to a device for stopping the flow of fluid through a tubular line. More particularly, this invention relates to a device for stopping the flow of fluid in a pipeline wherein the plugging action of the device is remotely directed by radio.

Detecting, locating and repairing leaks in fluid flow lines becomes a serious problem where the flow lines are inaccessible, as when buried in the ground. This problem is particularly serious in the petroleum industry with its many miles of flow lines, most of which are buried in the ground, and a major portion of which are located in relatively inaccessible country. Many attempts have been made to provide means for solving the problem of locating and repairing such leaks, particularly in the oil and gas industry where a substantial pipeleak becomes not only an economic loss but a potential danger.

The principal object of this invention is to provide a device which will perform a series of operations within a pipeline by means of remotely generated radio signals.

Another object of this invention is to provide a device which will move through a pipeline in response to fluid pressure therein and which device will perform at least one operation as directed by an outside source of radio waves.

Still another object of this invention is to provide a device capable of moving through a pipeline in response to fluid pressures therein, and which device includes radio responsive means for sealing the bore of the pipeline.

Further objects and advantages of the invention will become apparent from the following specification and claims taken in conjunction with the accompanying illustration which is a view in partial cross-section of a device according to this invention.

The device prepared according to this invention as described herein comprises a body member which is freely movable within a pipeline in response to fluid pressure within the pipeline when the device is in an inoperative condition. The device includes cooperating inflatable members which are inflatable by means of compressed gas source contained within the body member and wherein the compressed gas source is controlled by valves which in turn are directed by radio means situated remotely of the pipe line. The valve members controlling the compressed gas source are actuated by miniature radio receivers located within the body member. The radio receivers receive signals from the outside source and in response to the signals control the valves to inflate and deflate the expandable members attached to the body portion. The radio responsive valve means provide means for permitting the compressed gas to flow into the expandable members and thus stop the device, consequently stopping the flow of pipeline fluid at any desired point in a pipeline. Thus, if the leak is discovered in a pipeline at a great distance from the nearest shutoff valve, which may conceivably be many miles, the devices may be positioned close to the place where the leak is, on the upstream side of the leak, and the device used to shut off the flow of fluid. Then the pipeline may be repaired without the necessity of stopping the flow of fluid by means of the nearest shut-off valve with the subsequent drainage of the pipeline while the leak is being repaired.

Referring now to the figure in detail, the pipeline device of this invention includes an enclosed body portion 10 to which are attached a forward flexible member 12 and a rear flexible member 14 made preferably of rubber or pliable plastic material, which provide means for the pipeline fluid to propel the device of this invention through the pipeline. Flexible members 12 and 14 are disposed in a manner to fit closely against the inner walls of the pipeline and to expand sufficiently beyond the diameter body portion 10 so that a close fit with the inner walls is still provided even where there are slight variations in a pipeline or curvatures in a pipeline. Flexible members 12 and 14 are frusto-conical in shape. Forward flexible member 12 is held in position between flange portion 16 and a circular plate 18 which are secured by a plurality of bolts 20 and nuts 22. Rear flexible member 14 is secured between a flange 24 on body member 10 and a flat circular washer member 26 which are held together by means of a plurality of bolts 28 and nuts 30. Plate 18 includes a circular flange portion 32 which receives a cylindrical member 34. Cylindrical member 34 is secured to flange 32 by means of a plurality of machine bolts 36 to hold cylindrical portion 34 in secure relationship with flange 32. Positioned within cylindrical member 34 is an inflatable member 38, preferably formed of rubber or soft plastic material, and which is held in position within cylinder 34 by means of a forward nib 40 extending through a forward opening in wall 42 to hold inflatable member 38 removably within cylinder 34. The other end of inflatable member 38 is reduced to a neck portion 44 which is inserted through a conventional circular clamp 46 secured to the inner wall of cylinder 34. Inflating tube 48 is inserted through neck portion 44, said tube 48 hereinafter further described. Secured radially to cylinder member 38 is a plate 50 which serves as a support member for a toroidal inflatable member 52. Toroidal member 52 is further supported on its forward side by another plate member 54 secured to cylinder 56 which is received removably around cylindrical member 34. Cylindrical member 56 is held in its place around cylinder 34 by means of a plurality of machine bolts 58. Thus, inflatable member 52 is supported on each side, and since cylindrical support members 50 and 54 do not extend entirely to the interior wall of the pipeline when the device is in place, inflatable member 52 will expand slightly beyond the edges of members 50 and 54 to provide a tight seal against the interior wall. Inflatable member 52 is also prepared from a flexible inflatable material such as rubber or plastic. Inflatable member 52 includes a neck portion 60 which is passed through an opening 62 in plate 50. Neck portion 60 provides means by which inflatable member 52 is inflated and deflated, and the inflating gas passes into member 52 by way of inflating tube 64 inserted into neck portion 60 and held in place by means of a clamp 66.

Body portion 10 maintains these operating components in a sealed environment away from the fluids present in the pipeline. The operating components include one or more compressed gas cylinders 68 connected to a network of valves and tubing. Each compressed gas cylinder 68 is connected by means of a conventional valve and pipe connection 70 to a gas manifold 72, the outlet of which is connected to a T-connection 74, one arm of which provides the intake and exhaust connections for inflatable member 38, and the other arm of which provides intake and exhaust connections for inflatable member 52. Arm 76 leads to a solenoid valve 78 which, in its open position, provides for gas flow into inflatable member 38, and which in its closed position, prevents flow to inflatable member 38. The outlet from solenoid valve 78 includes another T-connection 80, one arm of which is connected to inflating tube 48 and the other arm of which is connected to another solenoid valve 82 placed in the exhaust line for inflatatable member 38. The exhaust side of solenoid valve 82 is connected to an exhaust tube 84 which passes sealingly through plate 18 and into communication with an area of the enclosing pipeline between body portion 10 and inflatable member 52. With the inflatatable member 38 in an inflated condition and solenoid valve 78 closed, placing solenoid valve 82 in an open position will permit gas to pass from inflatatable member 38 through exhaust tube 84 and into the pipeline.

The positions of solenoid valve 78 are controlled by signals received by a miniature radio receiver 86 which is set to receive signals of definite pre-determined frequencies to control the open and closed positions of valve 78. Solenoid valve 82 is controlled by another miniature radio receiver 88 which is also set to receive signals of a specific frequency to control the open and closed positions of solenoid valve 82. Thus, radio receivers 86 and 88 can be set to receive chosen frequencies and the valves 78 and 82 can be actuated from remote distances by means of these radio signals.

The other arm of T-connection 74 is connected to solenoid valve 90 to control the flow of gas to inflatable member 52. The exhaust side of solenoid valve 90 is connected to a T-connection 92, one arm of which is connected to inflating tube 64, mentioned previously, which provides means for passage of the compressed gas to inflatable member 52 as described above. The other arm of T-connection 92 is connected to another solenoid valve 94. The exhaust side of solenoid valve 94 is further connected to an exhaust tube 96 which passes sealingly through plate 18 and into the area of the pipeline between body portion 10 and inflatable member 52. Solenoid valve 90 is controlled by a miniature radio receiver 98 which responds to remotely generated signals to actuate solenoid valve 90 into its open or closed positions. Solenoid valve 94 is controlled by another miniature radio receiver 100 which also responds to remotely generated signals to control the open and closed positions of valve 94. Thus, when valve 90 is open and valve 94 is closed, compressed gas is permitted to pass through the valve 90 and tube 64 into inflatable member 52. And, when valve 90 is closed and valve 94 is open, compressed gas exhausts from inflatable member 52 by way of valve 94 and tube 96 into the pipeline. The inflation and deflation of members 38 and 52 can be separately controlled because of radio receivers 86, 88, 98 and 100 being set to receive and to respond to definite frequencies, and thus all four solenoid valves, 78, 82, 90 and 94 can be individually controlled.

In operation, the shutoff device of this invention is inserted into a pipeline on the upstream side of a leak, as at the nearest valve or access opening. The flow of the pipeline fluid will propel the shutoff device through the pipeline. Then, when the shutoff device approaches the leak, the solenoid valves are actuated by means of radio signals directed to the receivers contained within the shutoff device. Usually, the leak in the pipeline is easily located. Preferably, the shutoff device is positioned in the pipeline on the upstream side of the leak as close to the leak as possible. When located close to the leak like this, the pipeline can be excavated and the leak repaired without the necessity of draining fluid from the pipeline all the way back to the nearest shutoff valve which may be miles away. Pipeline leaks are generally located by means of airplane patrol of the pipeline when the seepage of oil to the surface becomes visible from above. As to location of the shutoff device in the pipeline, one specific manner of locating the device is to include a miniature radio transmitting set inside the body portion of the device and maintain radio contact with the device from the same remote station from which radio directions will eventually be given to the device.

The device is propelled through the pipeline by the action of the fluid flow upon the rear surface of flexible members 12 and 14. As mentioned above, these members do not have to be in a tight sealing contact with the pipeline walls; a fitting close enough to permit propulsion will be sufficient. Then, as the device approaches the leak, the remote radio station controlling the device emits a frequency to which receiver 98 is tuned and directs that receiver to open solenoid valve 90. Of course, heretofore during the journey through the pipeline, valves 78 and 90 have been closed. Compressed gas now flows through valve 90 and tube 64 to inflate inflatable member 52 and cause it to expand against the walls of the pipeline and cause the shutoff device to stop in the pipeline. Even though the device is stopped in the pipeline, a seepage of fluid through the device may still occur because of the non-sealing effect of members 12 and 14 which permit fluid to seek through, which fluid passes through a series of openings 102 in cylinder 34 at the rear of inflatable member 38. Since member 38 is in a deflated position, this fluid may escape to the front of the shutoff device through openings 104 in the forward wall 42 of cylinder 34. Inflating member 52 to stop the device before inflating member 38 prevents the sudden shock which would occur were the device stopped by the inflation of only a single braking member. Thus, member 52 is inflated first to stop the device. After the device has stopped, radio signals are passed from the remote station to radio receiver 86 to direct the receiver to open solenoid valve 78 and permit compressed gas to pass into tube 48 and inflate member 38 to the full sealing relationship with cylinder 34. Of course, during the inflation of members 52 and 38, exhaust valves 94 and 82 have been kept closed. Now with both inflatable members fully inflated, the fluid flow is completely shut off and the pipeline repairs may be completed.

After repairs are completed, the shutoff device is retrieved from the pipeline by deflating members 38 and 52 and permitting the shutoff device to be carried through the pipeline downstream to the next pipeline valve or access opening where the device is retrieved.

In the inflated condition of members 38 and 52, valves 78 and 90 can be directed to be closed after the members have reached their full inflation, or may be left open until the retrieval procedure has begun. In this instance, the solenoid valves 78 and 90 are then closed when retrieval is begun so that the gas contained in members 38 and 52 escapes into the pipeline. It is also possible to inflate the members 38 and 52 to a prescribed pressure which is measured by gages inserted in the proper lines (not shown in the drawing) and which pressures are transmitted to the remote station by the radio transmitter placed in the device (also not shown in the drawing). The deflation steps are the opposite of the inflation steps. A radio signal is given to radio receiver 88 to direct this receiver to open solenoid valve 82 so that the gas contained in inflatable member 38 passes out through exhaust tube 84 and into the pipeline area between the body portion and plate 50. This gas escapes through openings 102 into cylinder 34 and past the deflating member 38 out opening 104 ahead of the device. After member 38 is deflated, a radio signal is given to receiver 100 directing that receiver to open solenoid valve 94 to permit gas to pass from member 52 through valve 94 and exhaust tube 96 and also into the pipeline area between body portion 10 and plate 50. This gas also escapes through openings 102 and 104 ahead of the shutoff device. Then, with the deflation of member 52, the device again becomes responsive to the fluid flow in the pipeline and continues its journey.

What is claimed is:

1. A pipeline shutoff pig for closing the interior of a pipeline comprising:
   a body portion movable within a pipeline;
   inflatable toroidal sealing means secured to said body portion having a flow passageway opening therethrough;
   a cylindrical inflatable member positioned in said flow passageway opening in said toroidal sealing means;
   gas dispensing means carried by said body portion connected to said inflatable toroidal sealing means and said cylindrical inflatable member;
   a first radio actuated valve means between said gas dispensing means and said inflatable toroidal sealing means, said pipeline shutoff pig being free to move within a pipeline when said inflatable toroidal means is in a deflated condition and wherein, when said radio actuated valve means receives a first radio signal from an outside source, said signal actuates said first valve means to permit an inflating gas to flow from said gas dispensing means to said toroidal sealing means to cause said sealing means to expand to seal against the interior of a pipeline bore;
   a second radio actuated valve means connected between said toroidal sealing means and an exhaust port, wherein, when said toroidal sealing means is in an inflated condition and said second radio actuated valve means receives a radio signal from an outside source said second valve means is opened to permit said inflating gas to exhaust from said toroidal sealing means; and
   means for controllably inflating and deflating said cylindrical inflatable member.

2. A pipeline plug as described in claim 1 wherein said means for controllably insulating and deflating include:
   a third radio actuated valve member between said gas dispensing means and said cylindrical member to control inflation of said cylindrical member, and
   a fourth radio actuated valve member connected between said cylindrical member and an exhaust port to control deflation of said cylindrical member.

3. A pipeline plug as described in claim 1 in which said body portion includes a series of forward openings to allow the flow of fluid therethrough.

4. A pipeline plug as described in claim 1 in which said gas dispensing means includes a cylinder of compressed gas.

References Cited

UNITED STATES PATENTS

| 2,399,544 | 4/1946 | Danner | 138—93 |
| 2,601,248 | 6/1952 | Brenholdt | 15—104.6 XR |
| 3,269,421 | 8/1966 | Telford et al. | 138—97 |
| 3,381,714 | 5/1968 | Johnson | 138—97 |

LAVERNE D. GEIGER, Primary Examiner

EDWARD J. EARLS, Assistant Examiner

U.S. Cl. X.R.

138—93